(12) United States Patent
White

(10) Patent No.: US 6,221,463 B1
(45) Date of Patent: Apr. 24, 2001

(54) THREE-DIMENSIONAL FILM STRUCTURES AND METHODS

(76) Inventor: Eugene W. White, R.D. #1, Box 182, Rossiter, PA (US) 15772

( * ) Notice: Subject to any disclaimer, the term of this patent is extended or adjusted under 35 U.S.C. 154(b) by 0 days.

(21) Appl. No.: 09/112,034

(22) Filed: Jul. 8, 1998

(51) Int. Cl.⁷ .............. B32B 1/00; B01D 45/00; F24F 3/14
(52) U.S. Cl. .............. 428/174; 261/112.1; 261/DIG. 72; 210/660; 165/60; 165/158; 55/440
(58) Field of Search .................. 428/174, 178; 156/196, 199, 228; 210/660; 261/118, 112.1, DIG. 72; 165/60, 158, 900; 55/342, 344, 440, 521

(56) References Cited

U.S. PATENT DOCUMENTS

| | | | |
|---|---|---|---|
| 3,227,598 | * | 1/1966 | Robb ................... 428/178 |
| 3,388,522 | * | 6/1968 | Lowes ................. 428/178 |
| 3,876,492 | * | 4/1975 | Schott ................. 428/178 |
| 3,938,963 | * | 2/1976 | Hale ................... 428/178 |
| 3,940,811 | * | 3/1976 | Tomikawa et al. ...... 428/178 |
| 5,266,379 | * | 11/1993 | Schaeffer et al. ..... 428/178 |
| 5,348,788 | * | 9/1994 | White ................. 428/131 |

* cited by examiner

*Primary Examiner*—Donald Loney
(74) *Attorney, Agent, or Firm*—Hopgood, Calimafde, Judlowe & Mondolino, LLP

(57) ABSTRACT

A new fundamental structure that is simply and inexpensively formed offers a wide variety of functional attributes. The structure is formed from thin film sheet stock by pressure induced formation of select arrays of depressions and raised portions. The patterns formed provide an approximate minimal surface. Composite structures created by selective arrangement of the deformed sheets provide a highly functional arrangement of passageways and support lattice. These structures have low density, high strength, and select fluid carrying and heat exchange capabilities.

9 Claims, 8 Drawing Sheets

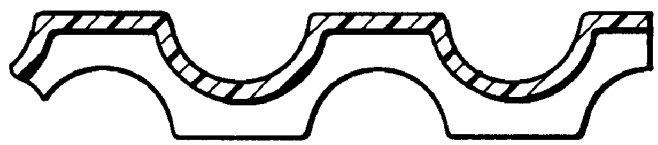
F I G. 2A
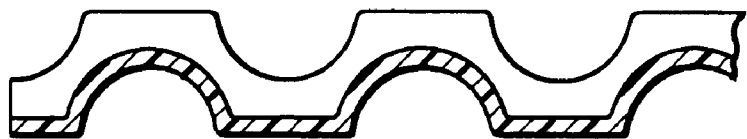
F I G. 2B
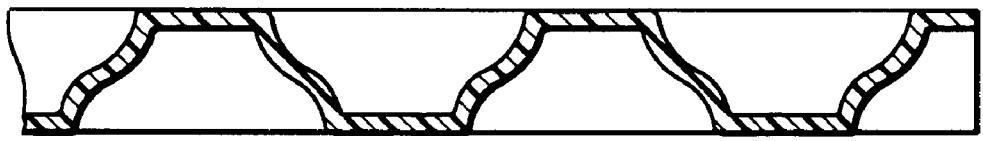
F I G. 2C

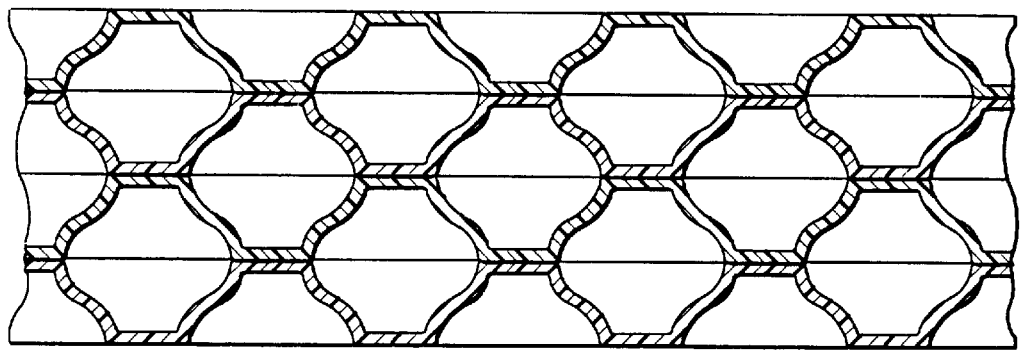
F I G. 7
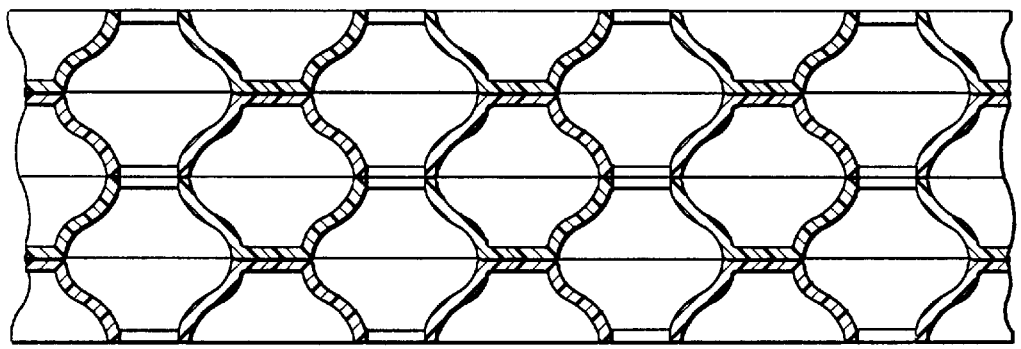
F I G. 8

THREE-DIMENSIONAL FILM STRUCTURES AND METHODS

FIELD OF THE INVENTION

The present invention is directed to three-dimensional structures formed from plastic films. More particularly, the present invention is directed to a method of transforming flat films into a select three-dimensional structural sheet, the structural features of the formed sheet, and the structures and apparatus available by assembling the formed sheets in a select manner.

Disclosure Document Nos. 423444 and 429903 were filed on Aug. 20, 1997 and Jan. 2, 1998, respectively. The contents of these Disclosure Documents are incorporated herein, as if restated in full.

BACKGROUND OF THE INVENTION

There has been a large effort to create unique materials having defined engineering properties for use in a wide variety of products. These materials are targeted at increasing certain functional characteristics, such as strength, or porosity, while minimizing cost and/or weight. Other desirable properties include durability, light transmissivity, corrosion resistance, and the like. Fundamental structures have been created that impart valuable properties to select products. For example, the "honeycomb" structure provides a high strength to weight ratio that has found broad application in demanding designs.

Another example is the porous minimal surface structures used as a bone substitute and other select medical applications. The present inventor is responsible for developing such a specialized material, described in U.S. Pat. Nos. 5,348,788 and 5,455,100, the contents of which are incorporated by reference as if restated in full. These structures provide a highly innovative solution to the difficult process of emulating a mathematically periodic minimal surface to impart select functional characteristics to the product at issue.

These patents and the associated technology, however, are focused on medical applications which have a narrow field of use and a rigid requirement definition. In this context, applications of fundamental minimal surface constructs are far more extensive and include:

1. Heat exchangers,
2. Catalytic converters,
3. Kiln furniture,
4. Photonic devices (including photonic band gap material),
5. Composite smart materials, and
6. High strength/weight materials.

Recognizing that this potential universe is largely unaddressed by current technology, the present inventions were developed to meet this need.

OBJECTS AND SUMMARY OF THE PRESENT INVENTION

It is, therefore, an object of the present invention to provide a structured three-dimensional film having select properties.

It is another object of the present invention to provide a method for creating a thin film having a select collection of structural properties including a three-dimensional periodic minimal surface.

It is yet another object of the present invention to provide a three-dimensional, semi-rigid film having a regular pattern of depressions and raised portions defining a select surface structure.

It is another object of the present invention to provide multiple films individually formed into select three-dimensional structures that are then layered to create a specific structural element having low density and a high strength to weight ratio.

It is a further object of the present invention to provide three-dimensional structures that allow for efficient heat exchange between two fluids brought into thermal contact by opposing networks formed throughout the three-dimensional structure.

It is yet another object of the present invention to provide a method of forming thin film, three-dimensional structures wherein the film is made from plastic material such as polyethylenes, PET (Mylar), polycarbonate (Lexan®), copper, brass, gold, and/or platinum.

It is a further object of the present invention to provide a mechanism to create selectively shaped films with regular surface characteristics.

It is yet another object of the present invention to provide a mechanism for creating a continuous web of three-dimensional film having a uniform pattern of depressions and raised portions.

The above and other objects of the present invention are realized in an illustrative thin film, three-dimensional structure having a matrix of depressions and raised portions at select intervals across the film surface. The film is formed by taking a thin sheet stock, initially flat, and placing it between opposing offset arrays of pins that are precisely aligned in two parallel plates. The process provides for deforming the films between the opposing pins by bringing the plates together, with the resulting tensile forces on the film creating a corresponding network of opposing depressions at regularly spaced intervals. Upon release from the opposing pins, the film retains the deformations created by the pins at the selected intervals, thus forming a three-dimensional structure with a tightly controlled matrix of depressions and raised portions. In addition, the uniform deformation forces applied to the film create a structure characterized by an approximate minimal surface (e.g., a saddle-shaped contour) between the depressions and raised portions.

The opposed array of pins are configured to have a uniform height across the array with each pin having a flat circular top surface. The flat top surface translates to a corresponding depressed circular flat in the deformed sheet. This flat region permits good adhesive contact between multiple sheets when layered together to construct a larger structure. The opposed array of pins are individually held in two flat metal plates by press-fit at the select height. The flat plates are placed in parallel alignment during the forming process, with the opposing pins arranged in parallel, but offset in a symmetrical manner to provide the alternating matrix of depression and raised portions in the film placed therebetween.

In accordance with the varying objectives of the present invention, the three-dimensional thin film structures are stacked with corresponding flattened peaks aligned to form points of adhesion. The resulting multi-layer structure creates a porous network of passages, separated by the minimal surface of the film. This network of passages is arranged in one configuration, to provide for at least two fluid chambers and passageways to permit enhanced heat exchange between the fluids. The chambers formed by the layer films may be selectively interconnected by opening one or more of the depressions or raised portions. In addition, the multi-layered structure formed by the above process provides significant rigidity and strength at a very low corresponding weight.

This provides a high strength to weight ratio and thus a very useful structural support component.

The foregoing features of the present invention may be better understood by review of the following description of an illustrative example thereof, taken in conjunction with the drawings of which:

BRIEF DESCRIPTION OF THE FIGURES

FIG. 2 provides several cross-sectional views of the three-dimensional film shown in FIG. 1 at select locations;

FIG. 7 provides a cross-sectional view of the three-dimensional multi-layered structure depicted in FIG. 6 showing adhesive points at corresponding depressions;

FIG. 8 provides a cross-sectional view of the three-dimensional multi-layered structure with alternating adhesive contact points drilled open to form conduits.

DETAILED DESCRIPTION OF THE INVENTION

First briefly in overview, the present invention is directed to a fundamental new shape comprising a selectively arranged network of depressions and raised portions regularly arranged across a relatively flat planer film. The film represents a very close approximation to a mathematically periodic minimal surface, wherein the boundary between the two domains (i.e., sides of the film) is minimized for a given three-dimensional structure. This can be seen by the saddle-shaped, gently curving surfaces that transition between contiguous raised portions and depressions.

The three-dimensional film structures are efficiently manufactured in an inexpensive press arrangement using opposing pin arrays held in place on two parallel plates. Sheets of stock (flat) film are positioned between the opposing pin arrays which are brought together, stretching and deforming the film. The opposing pins are offset by a pre-set amount, which allows for the creation of the corresponding regular array of depressions and raised portions on the film.

The resulting formed films become the building blocks for a variety of useful structures. These include simple structural cubes having desirable strength to weight ratios, heat exchangers utilizing the selectively created conduits between layered films, vibration damping cells, and the like. The deformed film, with selectively positioned openings placed in orthogonal relationship with the formed cubic structure, acts as a manifold to allow egress and/or ingress from the contiguous layers in the cubic structure.

Figure 1:
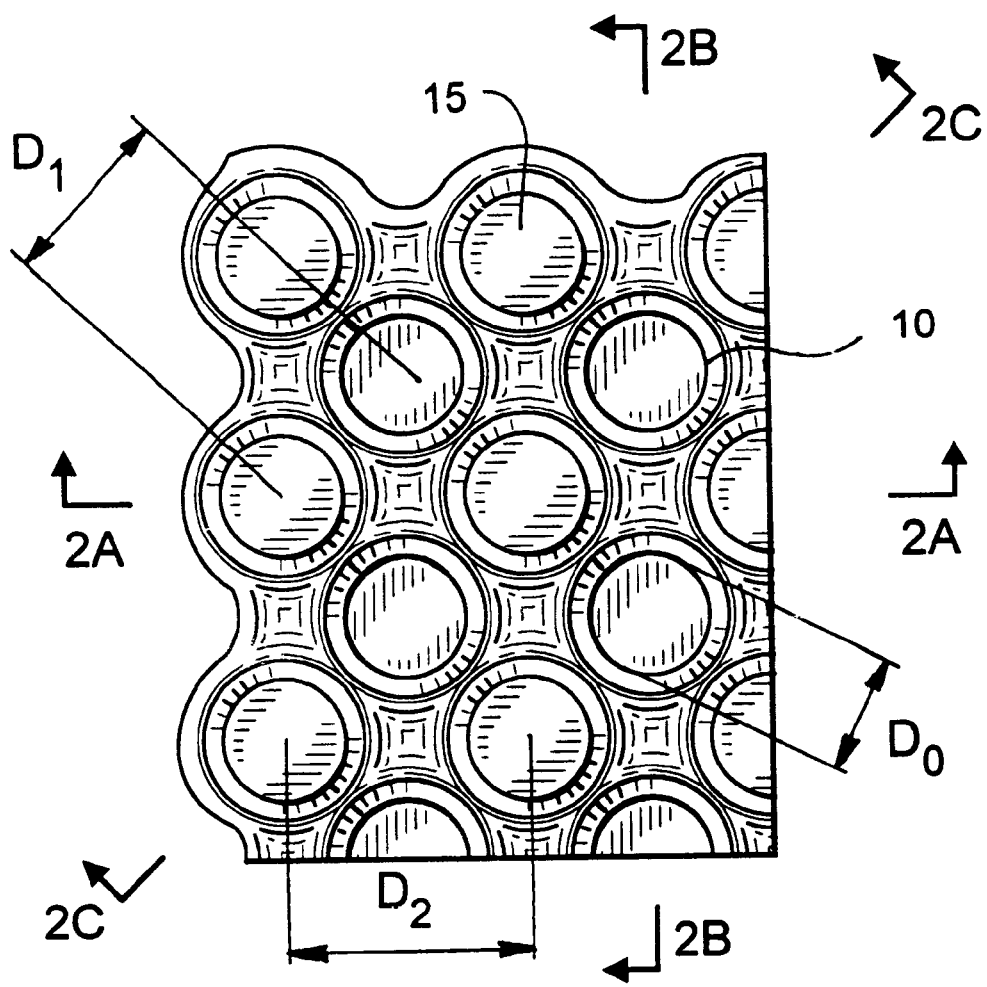
FIG. 1 provides a planar view of the top surface of a three-dimensional film formed in accordance with the present invention.

With the foregoing brief description in mind, attention is directed first to FIG. 1 wherein the resulting three-dimensional film is depicted. The top view depicts a first regular array of raised portions, 15, interspersed with a second regular array of depressions, 10. Each raised portion and depression includes a flat surface having a diameter, $D_0$. The sloping side walls of the raised portions transition to the surrounding four depressions. The center-to-center spacing between adjacent depressions and raised depressed portions is set at $D_1$, while the center-to-center distance between adjacent raised portions or adjacent depressed portions is set at $D_2$.

As can be seen in FIG. 1, the arrays of depressions and raised portions are identical, but offset by a predetermined distance to give the overall uniform pattern depicted. Like the raised portions, each depression includes a defined flat surface, also having a diameter of $D_0$. The resulting minimal surface characteristic is best appreciated by examination of the cross-sections for the deformed film, shown in FIG. 2. In particular, FIG. 2A presents a film cross-section that highlights the raised portions, while FIG. 2B provides the details for the depressions in the film. Diagonal section FIG. 2C provides a view of the transition shape between adjacent raised portions and depressions.

Figure 3:
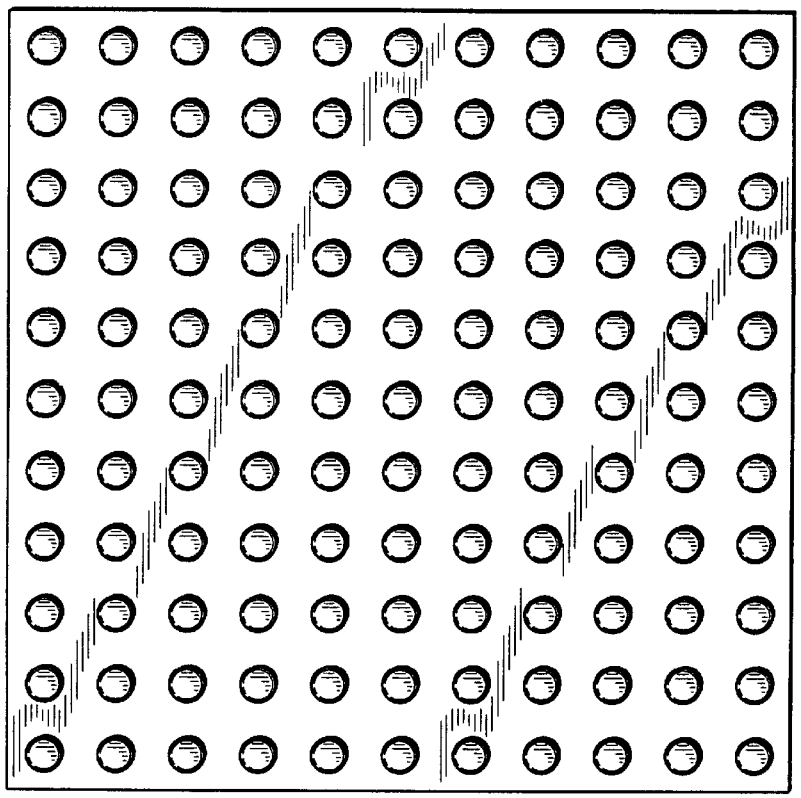
FIG. 3 provides an orthogonal view of the flat plate and pin structures used to deform the thin film.
Figure 3:
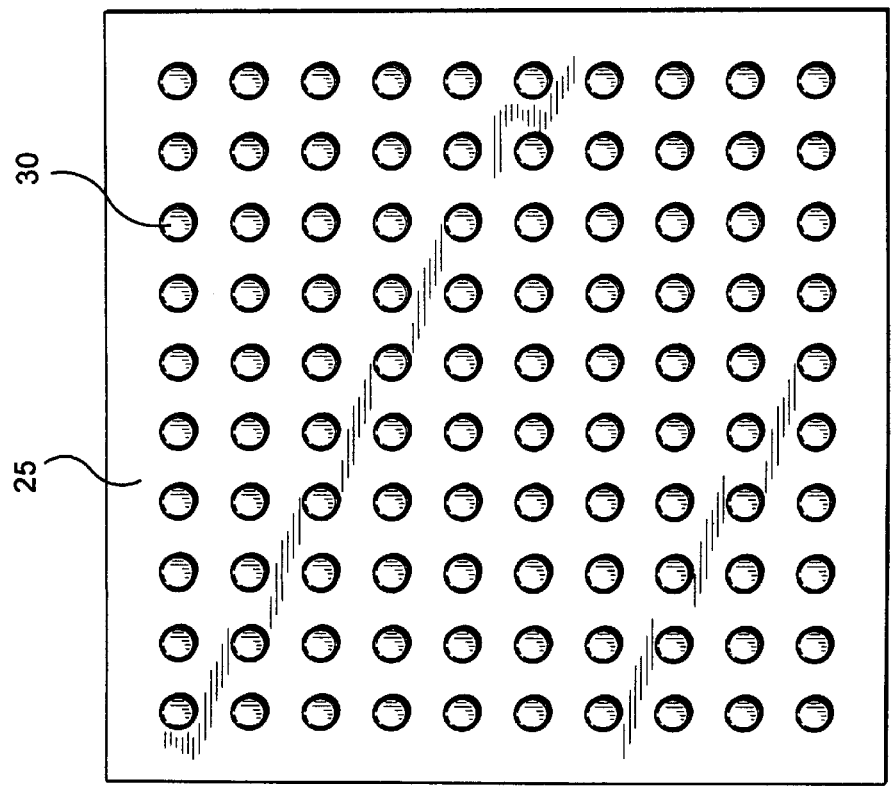

The foregoing film and associated shape characteristics are created by stretching and deforming a flat sheet stock between opposing arrays of offset pins, held in parallel alignment by two steel plates. This plate/pin arrangement is depicted in FIG. 3 and comprises a flat aluminum base, 25, with plural openings drilled therein. These openings are used to hold in position the elongated pins, 30. The arrangement provides for regular pin spacing, with all the pins held at a uniform height. Furthermore, each pin provides a flat round top surface for contraction and deforming the sheet stock. Exemplary dimensions for the pin structure provides for 0.25 inch diameter cylindrical pins spaced at 0.5 inch intervals, forming a square matrix.

Figure 4:
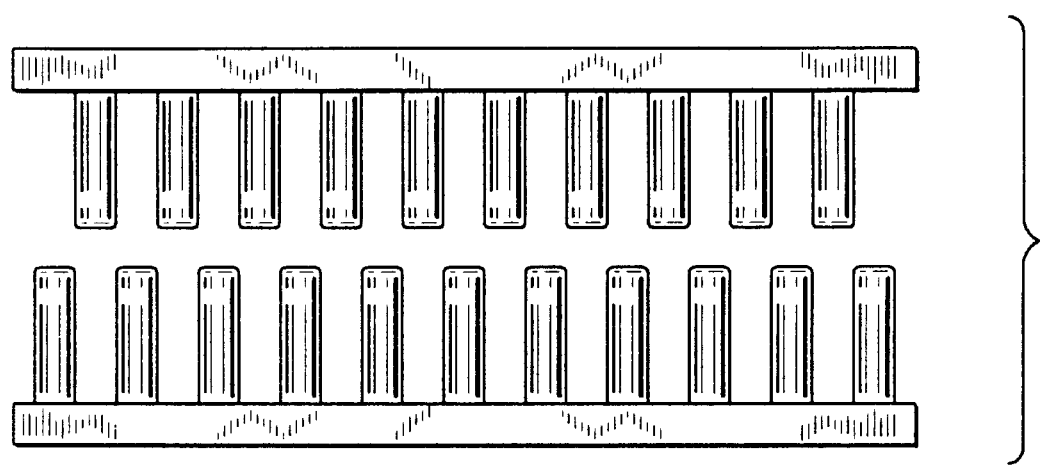
FIG. 4 provides a side view of the opposing pin array supported by the parallel flat plate arrangement.

As shown in FIG. 4, to create three-dimensional minimal surface, two plates with corresponding pins at the proper offset are held in opposing parallel alignment. This is best accomplished in a hydraulic press arrangement (not shown, but well-known in the art). Sheet stock film, such as 0.005 inch polyethylene (PE) is positioned between the opposing pins and the press closed, compressing the film a select amount. As engaged, the opposing pins are positioned equal distant to each other, providing a regular matrix of deformations.

To properly create the desired minimal surface shape, the forming fixture is preheated to 80° C. and hot air is circulated across the film during compression. For PE film, the plates continue towards each other until opposing pins pass each other by 0.25 inches.

The foregoing arrangement will provide 50:50 partition ratios. The diameters of the pins can be adjusted to create different, controlled ratios of 60:40 or 80:20, while maintaining minimal surface characteristics. While its important to retain an offset that provides a uniform matrix, opposing pin diameters may vary, changing the characteristics of the resulting sheets. In this way, the structure can be engineered to address many different applications.

The new forming method—plastically deforming thin film of plastic or metal foils—between opposing arrays of pins is readily suited to high volume production. Individual sheets can be processed sequentially by instrumented hydraulic presses that automatically control forming temperature. Rate of forming is controllable by standard hydraulic controls and pin penetration (formed sheet thickness) is accurately and reproducibly set by fixed mechanical stops. In this flat plastic geometry, formed sheets are removed on the "open" cycle and replaced by new flat sheets for forming during "forming" cycle.

When demand justifies, continuous production of "infinitely" long formed sheets can be achieved by configuring the desired pin arrays on large diameter drums. In this case, the correlating drums would be heated and as the plastic unrolls from the feed spool, it would be formed to the desired configuration as it passes through the closure gap. Drum rotation would pace the feed rate of the plastic and set drum gap would control form sheet thickness. As the formed sheet material emerges from the continuous forming operation, it can be sectioned to the desired handling length.

Pressures required to form the sheets of 0.003 inch thick PET and 0.005 inch polycarbonate are on the order of 30–50 psi; considered modest pressures by hydraulic press production practice.

Figure 5:
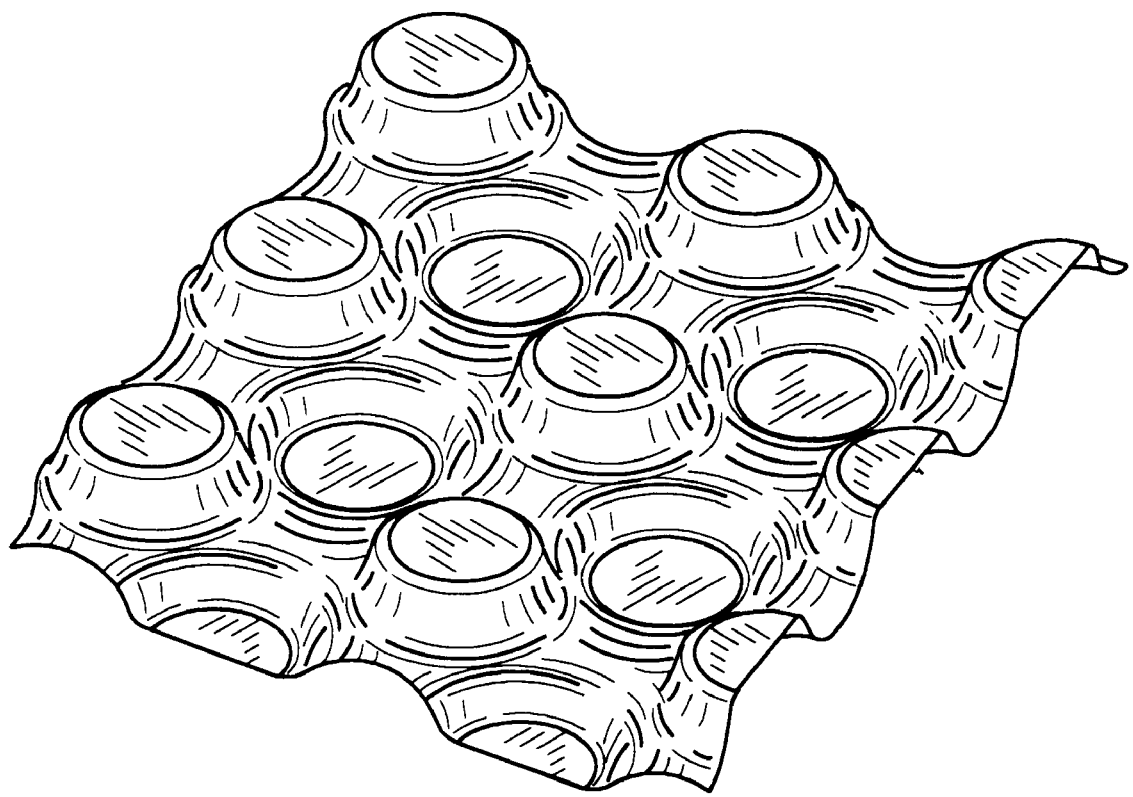
FIG. 5 provides a perspective view of a three-dimensional film formed by the present invention.

Turning now to FIG. 5, a perspective view of a single formed structured film is depicted with regular arrays of raised portions and depressions dispersed across its surface. As can be appreciated, this structure provides graduating sidewalls between adjacent depressions and raised portions; this gradient captures the minimal surface feature for the film structure as formed using the technique described above. The flattened tops of the raised portions and the flattened bottoms of the depressions form the connecting surfaces for layering the sheets together to form the desired structural elements.

Figure 6:
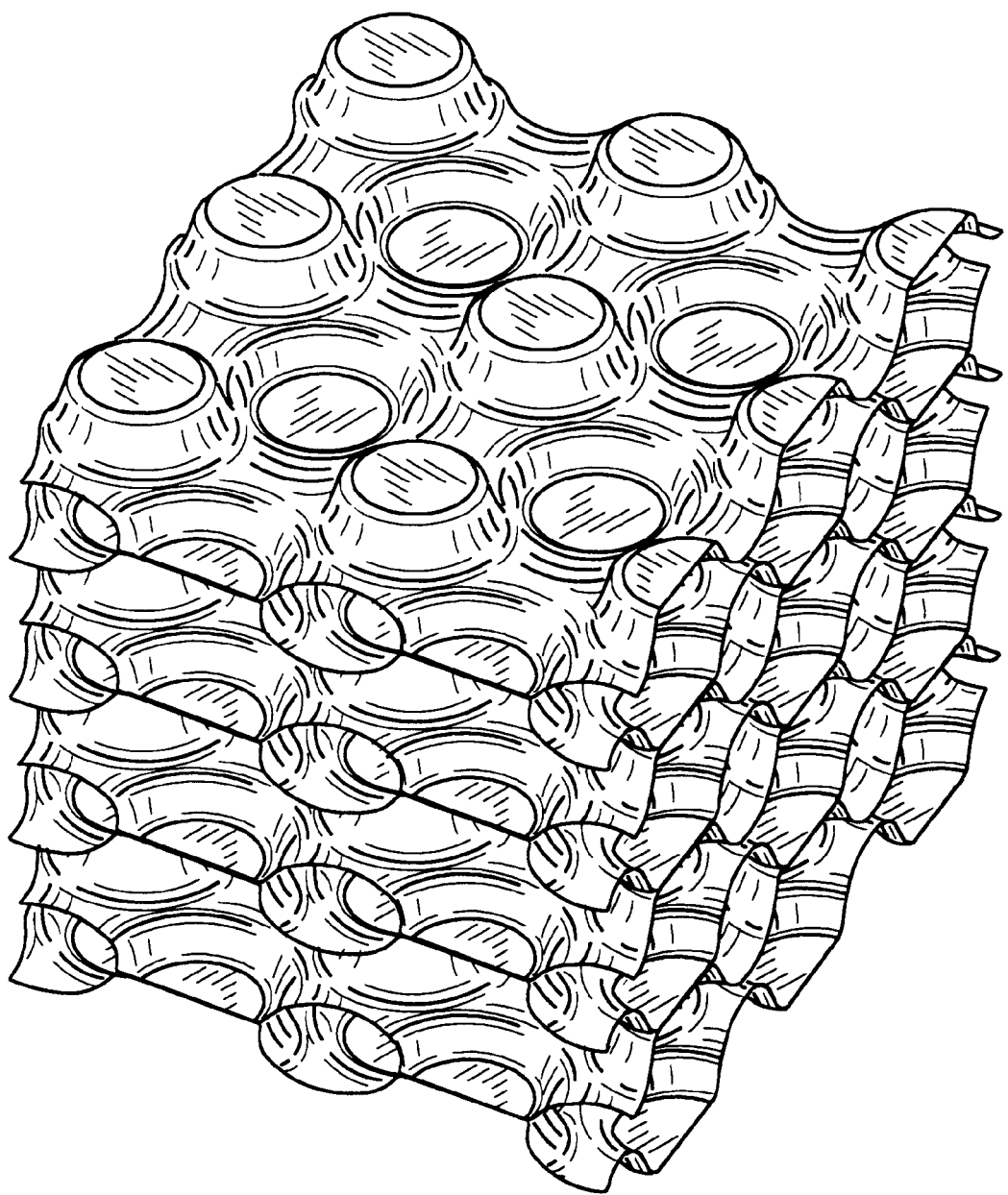
FIG. 6 provides a perspective view of a three-dimensional cubic structure formed by layering multiple deformed sheets.

The layered structure formed by taking the sheets of FIG. 5 and sequentially attaching these onto corresponding sheets with the flattened areas forming the connecting points results in the shape depicted in FIG. 6. Although shown as a cube, this is of course just a function of the assembly of the sheets that form the building blocks for the resulting structure. As can be seen, the sheets are connected via adhesive bonding between the vertically aligned flattened areas between the raised portions of the lower sheet and the depressions of the upper sheet. Adhesion is accomplished by ultrasonic welding, thermal bonding, adhesive (glue), or similar. The resulting structure has extremely high strength to weight ratios. For the PE sheets, the composite structure provides support for 3000 times its own weight with a reversible 10 percent compression.

Continuing with FIG. 6, the three-dimensional structure establishes plural passageways and horizontal chambers, separated by the minimal surface. A manifold on one end of this structure can be created by taking a single sheet (see FIG. 5), selectively creating openings (by drilling), and placing the opened sheet orthogonally across the cube side in FIG. 6. Due to the correspondence in size and symmetry, a variety of manifold arrangements are possible with this approach.

The next series of Figures depict cross section of the composite structure shown in FIG. 6, but with modifications. First, in FIG. 7, the cross section depicted is simply the cross section of the composite structure shown in FIG. 6 and demonstrates the linking interfaces that in combination with the minimal surface (also shown) give the structure its strength and rigidity.

In FIG. 8, the cross-section depicts the machining of openings through the flattened regions on alternating levels within the structure. This teaches a critical attribute of the present invention—the ability to selectively adjust the interior structure to accomplish a desired engineered purpose. For this arrangement, the alternating openings machined into the matrix provides for segregated passages within the composite structure. As will be described in more detail below, this particular arrangement permits multi-fluid passages or conduits permitting high efficient heat transfer.

Figure 9:
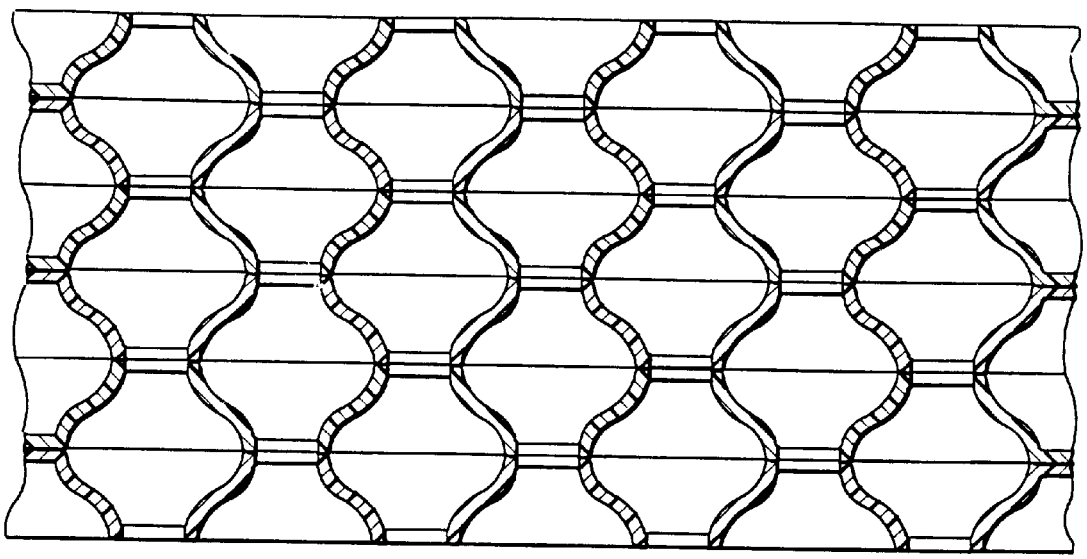
FIG. 9 provides a cross-sectional view of the three-dimensional multi-layered structure wherein all contact points are drilled open leaving a fully opened matrix.

In FIG. 9, the cross-section depicts a composite structure which has been completely machined, with full passageway interconnection. The resulting structure is created by drilling all the flattened regions that connect the layers and provides a very light and resilient structure. This structure has cubic symmetry.

Because the deformed plastic films are transparent, the resulting composite structure will permit light passage, although the curved surfaces will distort and diffuse the light as it passes therethrough. Structural components made in this way will allow light weight but strong engineered illumination, thus expanding the available applications. Preformed building blocks would diffuse and distort light and thus substitute for heavy structural "glass" blocks typically found in commercial construction.

Composite structures are applied to air-to-air heat transfer such as turning over interior contaminated air with fresh (but cooler) outside air. The plastic minimal surface is durable, and if moisture permeable, performs limited moisture conservation. The transparency of the exchanger permits dual functionality as a light source to the interior. Modular design allows for easy disassembly and cleaning.

Similar advantages are seen in liquid-to-air heat exchangers. By changing the partition ratio, the chamber sizes can be adjusted to match the desired flow rate for each of the fluids, and/or the heat capacity for the fluids.

The low density of these structures permits extensive use where weight factors are critical, e.g., transportation (auto, plane, etc.). For example, a properly configured and layered structure of the present invention will provide lightweight internal support for an airplane wing, concurrent with providing a void volume capable of fuel storage (known as a "wet wing" design). The matrix of the structure prevents sudden shifts in fuel during acceleration/deceleration of the vehicle.

Although the invention has been described in detail for the purpose of illustration, it is to be understood that such detail is solely for that purpose and that variations can be made therein by those skilled in the art without departing from the spirit and scope of the invention.

What is claimed is:

1. A heat exchanger comprising plural thin films, each film having an array of regularly spaced raised portions and depressions forming a uniform matrix of deformations, said films arranged in layers attached at selective junctions defined by said depressions and raised portions aligned in adjacent arrangement, wherein corresponding adjacent depressions and raised portions are selectively machined to allow interconnection between adjacent layers, and manifold sheet placed on a surface orthogonal to said layers with selective openings to control ingress and egress of thermal fluids.

2. The heat exchanger of claim 1 wherein the plural thin films are formed of a thermoplastic material.

3. The heat exchanger of claim 1 wherein the thermal fluids include air and water.

4. The heat exchanger of claim 1 wherein the matrix of deformations form an approximate periodic minimal surface.

5. A heat exchanger comprising:
   a plurality of film structures each including a uniform array of raised elevations and depressions spaced at regular intervals to form a matrix, said film structures arranged in layers and securely attached at corresponding raised portions and depressions aligned in adjoining arrangement, said attached corresponding raised portions and depressions providing interconnection between layers for fluid flow; and at least two manifolds placed on a surface orthogonal to said layers, said manifolds having apertures to control ingress and egress of fluids.

6. The heat exchanger according to claim 5, wherein said film structures are made of a thermoplastic material.

7. The heat exchanger according to claim 5, wherein said fluids include air and water.

8. A heat exchanger having a low density, high strength to weight ratio comprising:

a plurality of individually formed three dimensional structures having a series of raised portions and depressions defining a minimal surface area therebetween, said structures layered and attached at selected and corresponding raised portions and depressions and providing a high strength to weight ratio, said structures machined at said selected and corresponding raised portions and depressions creating a network of chambers throughout said exchanger; and at least two manifolds placed on surfaces orthogonal to said structures, said manifolds having apertures to control ingress and egress of thermal fluids in the network of chambers.

9. An ion exchanger comprising:

a plurality of individually formed three dimensional porous structures having a series of raised portions and depressions defining a minimal surface area therebetween, said structures layered and attached at selected and corresponding raised portions and depressions to form segregated passages within said ion exchanger, said structures machined at said selected and corresponding raised portions and depressions creating a network of chambers throughout said exchanger for passage of fluids therein;

at least two manifolds placed on surfaces orthogonal to said structures, said manifolds having apertures to control ingress and egress of fluids in the network of chambers.

* * * * *